United States Patent
Schulze

[11] 4,004,747
[45] Jan. 25, 1977

[54] WINDING APPARATUS

[75] Inventor: Wilhelm Schulze, Delligsen, Germany

[73] Assignee: Maschinenbau Greene GmbH & Co., KG, Kreiensen, Germany

[22] Filed: June 23, 1975

[21] Appl. No.: 589,029

Related U.S. Application Data

[63] Continuation of Ser. No. 442,878, Feb. 15, 1974, abandoned.

[30] Foreign Application Priority Data

Nov. 9, 1973 Germany .................... 2232338

[52] U.S. Cl. .................. 242/56.5; 242/56.6; 242/67.2
[51] Int. Cl.² .............. B65H 35/02; B65H 35/04
[58] Field of Search ..... 242/56 R, 56 A, 56.2–56.9, 242/67.1 R, 67.3, 67.2, 65

[56] References Cited

UNITED STATES PATENTS

| | | | |
|---|---|---|---|
| 3,236,469 | 2/1966 | Ganz | 242/56.4 |
| 3,279,718 | 10/1966 | Arterton | 242/67.1 R |
| 3,345,009 | 10/1967 | Rockstrom | 242/56 A |
| 3,460,773 | 8/1969 | Breaker | 242/56.6 |
| 3,697,010 | 10/1972 | Nystrand | 242/56 A |
| 3,765,616 | 10/1973 | Hutzenlaub et al. | 242/56.5 |

FOREIGN PATENTS OR APPLICATIONS 742,129 10/1943 Germany .................... 242/56.4

*Primary Examiner*—Stanley N. Gilreath
*Assistant Examiner*—John M. Jillions
*Attorney, Agent, or Firm*—Edmond T. Patnaude

[57] ABSTRACT

There is described a device for longitudinally slitting a web and for separating the separated portions thereof before they are fed onto a takeup reel or core.

2 Claims, 2 Drawing Figures

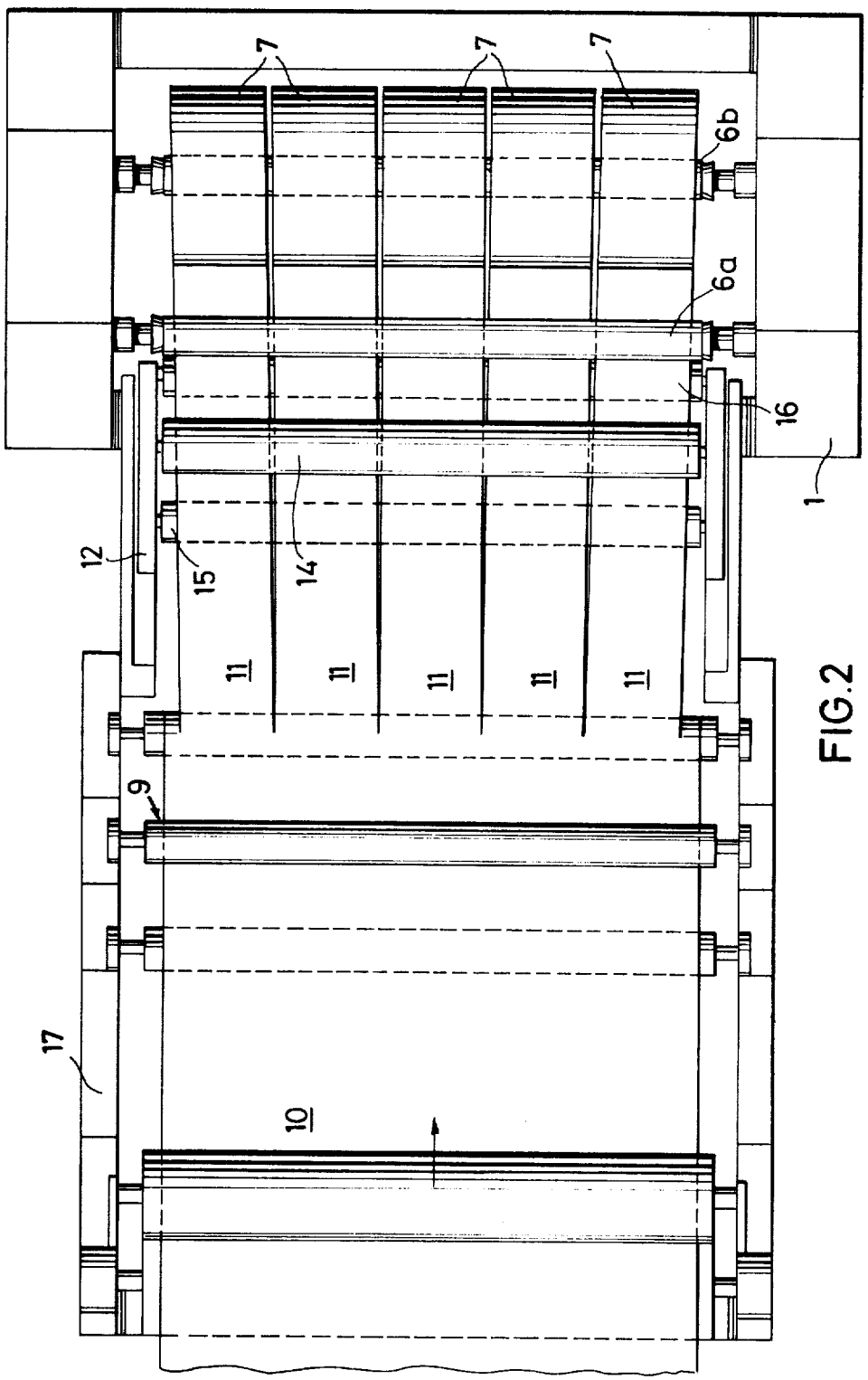

WINDING APPARATUS

This is a continuation of application Ser. No. 442,878, filed Feb. 15, 1974, now abandoned.

This invention relates in general to web winding machines and it relates in particular to an improvement of the device disclosed and claimed in my copending Application Ser. No. 360,787 filed May 16, 1973, now U.S. Pat. No. 3,908,924.

BACKGROUND OF THE INVENTION

The aforesaid application discloses an apparatus for use on machines for winding webs of material, in particular plastic films, wherein by means of a separating element movable into the path of the web and extending over the width of the web the travelling web of material is separated from a rotatably driven winding core and reapplied to a new winding core.

In accordance with the invention described in the aforesaid application, when in the separating and applying position of the winding core, the working edge of the separating element is swingable in the feed direction of the web coaxially with respect to the winding core. It is possible by the use of such an arrangement and movement of the separating element to effect the separating operation satisfactorily, even at high winding speeds, and in fact this is so when separating plastic films and when using separating elements in the form of a saw which are often found to be effective for such films. The applying operation can also be carried out satisfactorily. The special advantage of the invention according to the aforesaid application lies in the fact that the winding speeds including the separating operations can be chosen to be so great that the winding speed can practically be suited to the delivery speed of the existing production machine. As a result, the working speed of the overall production can be substantially increased.

The requirement frequently arises, in the case of webs of material wound in their full width, and in particular in the case of films of plastic material, to cut or slit such webs longitudinally into individual webs of smaller width. It has been shown that by using the known arrangements wherein a cutting knife is moved transversely to the moving web of material, the production of such divided webs of material is not possible because, although a first portion of the web can be applied to the winding core during the separating operation, the remaining separated widths of the web fly loose, this being on account of the fact that an oblique cutting line results from the use of the known devices. Accordingly it has been the previous practice to use exclusively the so-called slitter rewinders, which have a separate longitudinal parting device. By this means the fully wound core is delivered over its full width to the slitter rewinder, at which point it is, in the course of a rewinding operation, subdivided by the longitudinal parting or slitting device. Subdivided widths of the web are then wound up on separate winders. Quite apart from the disadvantage of the fixed length of all the individual widths of material, a further quite substantial disadvantage of these rewinders is to be seen primarily in the additional capital expenditures for additional equipment and working, and above all in the fact that a separate expensive machine is necessary merely for separating the web into webs of smaller width.

The basic object of the present invention is, while employing the principles of the invention of the aforesaid application, to avoid these disadvantages and instead to provide an arrangement by the aid of which longitudinal separation of the web of material can be effected, and the winding of the individual webs carried out immediately following the production machine and directly upon the winding machine itself.

SUMMARY OF THE INVENTION

In accordance with the teachings of the present invention this object is achieved in that a longitudinal parting device for the web of material coming from the production machine is interposed in front of the swingable separating element extending over the width of the web. The web of material coming directly from the production machine is separated into individual strips by means of the longitudinal parting device, and subsequently by means of the separating element the separating and applying operation takes place over the total width of the web, while all of the travelling starting ends of the individual webs are automatically and satisfactorily wound upon the winding core. This result is achieved by mounting the separting element so that it is coaxially to the winding core. As a result, the provision of an additional machine in the form of a rewinder is unnecessary, and an emerging web of material of the full width can be separated into individual webs and at the same time wound into individual rolls at the full delivery speed of the production machine. It has been shown that both the separating operation of all the individual webs as well as the reapplication of these individual webs can be satisfactorily completed. A further advantage is to be seen in the fact that, on account of the direct longitudinal separation and winding up of the individual webs, individual webs of varying length can be separated and wound up according to the control of the separating element, while in the case of the prior art machines it is only possible to produce individual webs of a length determined by the full width of the roll of the web material.

In a preferred embodiment of the invention, a width stretching device is arranged between the longitudinal parting device and the separating element. In this manner it is possible, after the longitudinal parting operation, to create a spacing between the individual webs so that the completely wound individual rolls of the individual webs likewise are spaced from each other, whereby the separation of the winding core with the individual rolls is facilitated.

Preferably, according to a further aspect of this invention, the width stretching device and a pressure roller are arranged upon a common support which is capable of being fed towards the winding core, whereby the pressure roller is maintained in continuous contact with the wound rolls of material. By this means, in particular when operating with thin films, it is possible to achieve a continuous control to keep the winding operation clean and free from folds, and at the same time to maintain the desired relationship between the width stretching device and the pressure roller.

GENERAL DESCRIPTION OF THE INVENTION

A preferred embodiment of the invention is illustrated in the accompanying drawings wherein only those parts of the machine and device which are necessary for an understanding of the invention are shown and wherein:

FIG. 1 is a schematic side elevation of the device according to the invention; and FIG. 2 is a plan view of the device shown in FIG. 1.

DETAILED DESCRIPTION OF THE INVENTION

Figure 1:
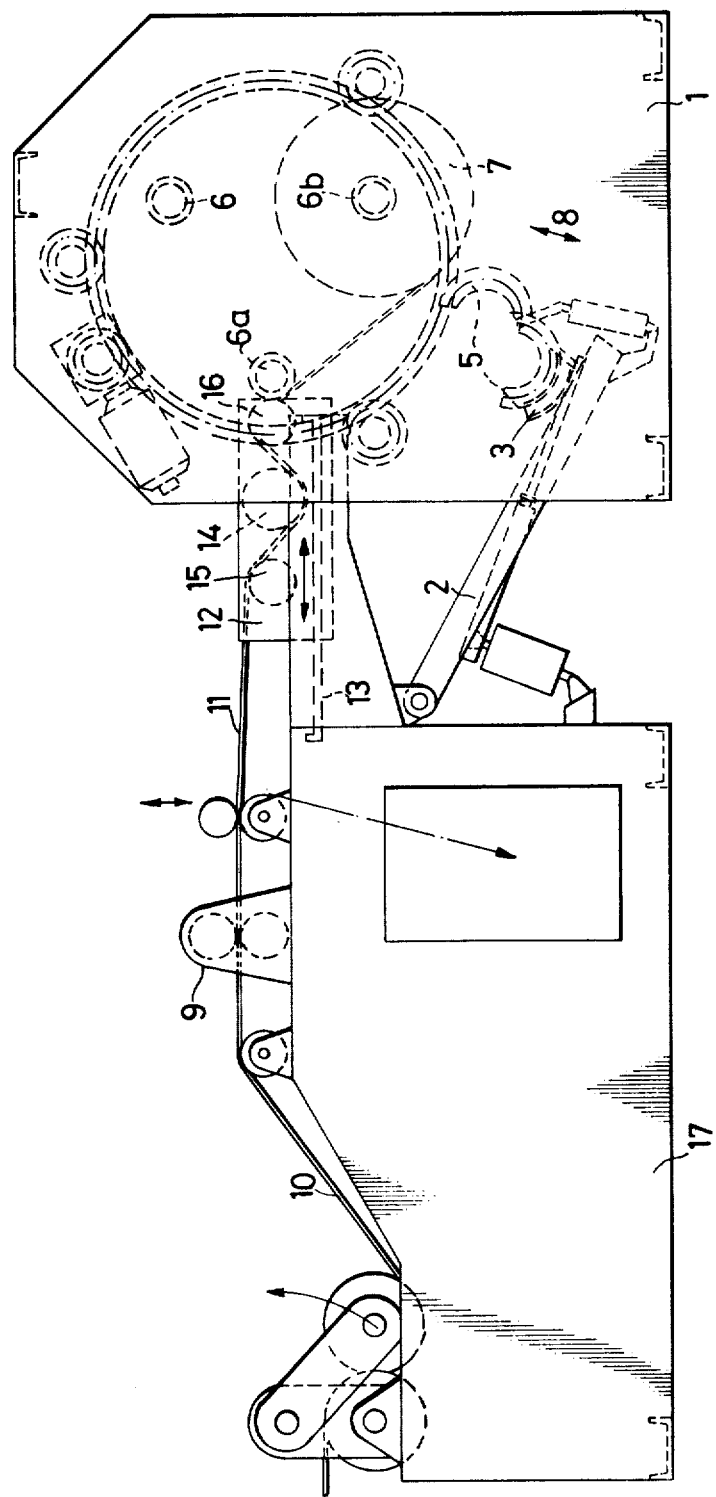

Referring to the drawings, the separating and winding device of the present invention is mounted on frame 1. Upon a pivoted arm 2 there is mounted the swingable separating element 3 with its cutting edge in the manner described in the said U.S. Pat. No. 3,908,924. Likewise there is shown a hinged bearing 5 for the separating element 3. Upon a suitable support there are mounted the rotatably driven winding cores 6, 6a and 6b, which can also be swung into the respective separating and applying positions, in which latter position is situated the winding core 6a as shown in FIG. 1. The separating and winding device is shown in FIG. 1 in its position shortly before commencing a new separating and applying operation. The winding core 6b therefore carries a number of almost completely wound individual rolls 7, five such individual rolls 7 being shown in FIG. 2. These individual rolls 7 represent the end product of the separating and winding operation according to the invention. The separating element 3 including the cutting edge is swingable upon the arm 2 in the direction of the double arrow 8 (FIG. 1) towards the separating and applying position until, in that position the winding core 6a is engaged, as is shown and described in detail in the said copending application.

In the arrangement according to the present invention there is interposed in front of the separating and applying position, and in front of the separating element 3 and its edge, a longitudinal parting or slitting device or roller knives 9, which can be constructed in a known manner. By means of this longitudinal parting device 9 the web of material 10 coming from the production machine is separated, according to this practical example, into five individual webs 11. At the same time marginal strips are cut from both sides of the main web as shown in FIG. 2. A transverse spacing device 14 taking the form of a width expanding roller is arranged upon a common support 12, preferably taking the form of a slide travelling under a hydraulic or pneumatic drive upon rails 13. In front of the width spacing roller 14 there is mounted a guide roller 15 while following the width spacing roller 14 there is arranged a pressure roller 16. By means of the common slide 12 the width spacing roller 14 and the pressure roller 16 are continuously moved in the direction towards the winding core 6a on which the web is to be wound so that the pressure roller is in continuous contact with the wound individual rolls 7.

By means of the width stretching roller 14 the individual webs 11 coming from the longitudinal parting device 9 are spaced apart by a certain extent so that there is an axial spacing between the individual webs 11, and therefore also between the individual rolls 7, as is clearly shown in FIG. 2.

The practical example of the invention here shown and described demonstrates that, by the aid of the arrangement according to the invention it is possible to divide into individual webs 11 the web of material 10 coming directly from the production machine, for example from the calendar, and simultaneously to separate, to apply, and to wind up these individual webs at the full speed of the emerging web of material 10. When the preceding winding operation has been completed, the pivot arm 2 with the separating element 3 is moved in a suitable manner into the region of the winding core 6a. At a predetermined instant of time the separating operation is effected by the cutting edge by the coaxial swinging movement of the separating element 3 in the feed direction of the individual webs 11, while at the same time the application of the individual webs onto the winding core 6a is effected, whereafter the winding operation for all the individual webs 11 continues with these webs spaced at the intervals determined by the width stretching roller 14.

The longitudinal parting device and the width spacing device are appropriately arranged upon a separate machine frame 17, which is connected in any suitable manner with the machine frame 1. Preferably hydraulic or pneumatic driving arrangements, which do not contribute to an explanation of the invention and are therefore not described in detail, serve for driving the individual elements.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What I claim is:

1. Apparatus for slitting a continuous web of material into a plurality of spaced webs and for transferring said webs onto winding cores, comprising
   a machine frame to which said continuous web of material is supplied,
   a plurality of said winding cores adapted to be rotatably driven to wind said web of material thereon,
   means for selectively moving said cores into and out of a winding position,
   a pressure roller biased toward the respective one of said cores in said winding position,
   means carried by said machine frame for feeding a continuous web of material between said pressure roller and the one of said cores in said winding position,
   a separating element having a web cutting edge extending transversely across said web for swinging movement into a web separating position to transversely cut said web to provide a free edge for attachment to another one of said winding cores,
   a pair of mutually parallel spaced rails mounted to said machine frame and extending in the direction of movement of said web to said winding position,
   a support device mounted on said rails for reciprocal rectilinear movement thereon,
   said pressure roller being mounted on said support device,
   (a web spacing roller carried by said support device in fixed spaced relationship with said pressure roller, and)
   web slitting means mounted on said frame upstream of said spacing roller for slitting said continuous web into a plurality of adjacent longitudinal web sections, and
   a web spacing roller carried by said support device in fixed spaced relationship with said pressure roller to expand the width of said web coming from said slitting means,
   whereby said continuous web of material is slit into a plurality of separate continuous webs, which webs are subsequently spaced apart and then wound on said winding cores.

2. Apparatus according to claim 1 further comprising a guide roller journaled to and carried by said support device between said web slitting means and said web spacing roller.

* * * * *

UNITED STATES PATENT AND TRADEMARK OFFICE
CERTIFICATE OF CORRECTION

PATENT NO. : 4,004,747
DATED : January 25, 1977
INVENTOR(S) : Wilhelm Schulze

It is certified that error appears in the above-identified patent and that said Letters Patent are hereby corrected as shown below:

Column 4, line 51, Please delete "(a web spacing roller carried by said support device in fixed spaced relationship with said pressure roller, and)".

Signed and Sealed this

Seventeenth Day of May 1977

[SEAL]

Attest:

RUTH C. MASON
*Attesting Officer*

C. MARSHALL DANN
*Commissioner of Patents and Trademarks*